INVENTORS
ELMO F. HUSTON &
JAY L. NICHOLLS

BY Kenneth W. Miller

ATTORNEY

Sept. 17, 1963     E. F. HUSTON ETAL     3,104,278
ELECTRICAL APPARATUS HOUSING

Filed Feb. 15, 1960     2 Sheets-Sheet 2

INVENTORS
ELMO F. HUSTON &
JAY L. NICHOLLS
BY

ATTORNEY

United States Patent Office 3,104,278
Patented Sept. 17, 1963

3,104,278
ELECTRICAL APPARATUS HOUSING
Elmo F. Huston, Akron, and Jay L. Nicholls, Wadsworth, Ohio, assignors to The Ohio Brass Company, Mansfield, Ohio, a corporation of New Jersey
Filed Feb. 15, 1960, Ser. No. 8,812
13 Claims. (Cl. 174—163)

This invention relates to fluid sealed enclosures and to electrical apparatus incorporating fluid sealed enclosures as housings.

A general object of the invention is to provide a fluid tight and pressure resistant enclosure incorporating ceramic and metal parts.

Another general object of the invention is to connect two parts having widely different coefficients of expansion.

A specific object of the invention is to connect a tubular ceramic member and a metal plate which is arranged across the end of the ceramic member to close the interior of the ceramic part and to maintain a seal between the two parts under conditions of severe thermal duty.

Another general object of the invention is to increase the strength, durability and length of life of bushings, potheads, insulators and the like.

In bushings, potheads and other like through and terminating devices, a metallic conductor is utilized for transmitting electrical energy from one functional device or apparatus to another, the latter usually a conductor or lead. The conductor is insulated from the associated elements, or parts of the device by various insulating means and, where the device is to be used at high voltages, the insulating means includes a tubular ceramic member which constitutes all or part of a housing for the device. The interior of the housing is filled with oil or gas to provide a self-healing, insulating medium, of high dielectric strength.

In such devices, the connections between the metal and ceramic parts of the housing must retain the insulating medium at high pressure and over a wide range of temperatures. However, because of the severe electrical and thermal duties imposed upon the parts, the known arrangements of joints and seals have been generally complex and expensive and have had a limited range of effectiveness as regards temperature change and thermal shock.

The present invention relates to an improved joint and closure for ceramic and metal housing and end parts utilized in potheads and bushings, and in which the connection between the parts is maintained in fluid sealed and pressure tight condition without substantial diminution due to thermal changes. The electrical apparatus housing of the invention incorporates a clamping arrangement between an end plate and a shoulder on the exterior of a tubular ceramic member, in which the dimensional changes of the member and the end plate are accommodated by a particular construction and arrangement of the members.

The invention, together with further objects, features and advantages thereof, will be more readily understood by reference to the following detailed specification and claims taken in connection with the drawings, in which:

Figure 1:
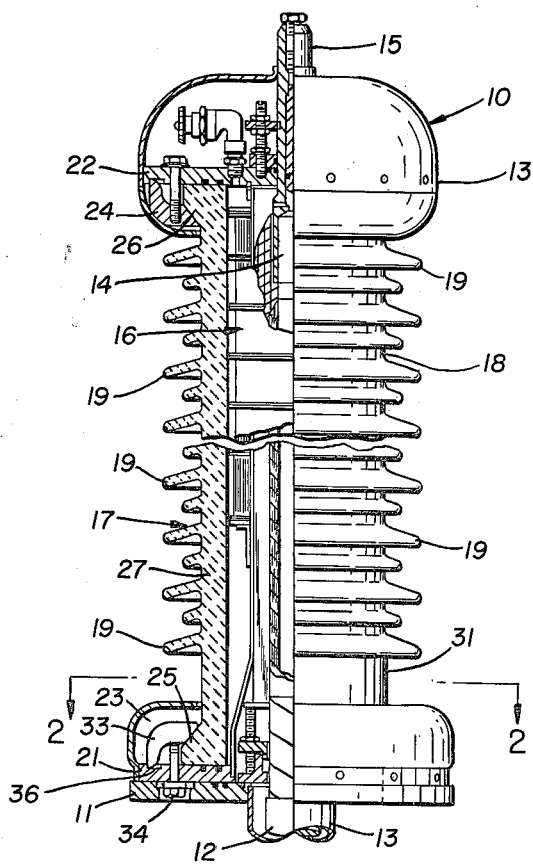
FIG. 1 is an elevation view, shown partly in section and partly broken away, of a pothead embodying the invention.

As shown in FIG. 1, a pothead 10, embodying the invention, is supported on a base plate 11 which has a cable 12 received through an opening centrally through the plate. A conduit 13 is welded or otherwise secured to the underside of the base plate and provides, with certain related apparatus not shown herein, a sealed enclosure about the end portion of the cable sheath. The cable conductor and insulation extend into the interior of the pothead and the conductor 14 of the cable is received in and integrally attached to a terminal 15, which extends from the interior to the exterior of the pothead to provide electrical connection to the associated power circuits. Related apparatus in the interior of the pothead, designated generally at 16, accomplishes certain electrical and mechanical functions necessary for termination of the cable.

The interior of the pothead 10 is in fluid communication with the interior of the cable and an insulating medium such as oil or gas may be introduced into the system through the top plate 22, or through suitable means connected to the conduit 13. The insulating medium is maintained under pressure suitable to the physical condition of the particular installation.

The housing 17 of the pothead comprises a tubular ceramic member 18, suitably formed on the exterior with skirts 19, to extend the leakage distance between the terminal 15 and the base plate 11, and, on the interior, with a cylindrical through opening. Two end plates 21 and 22 extend across the ends of the ceramic member 18 and are held against the end faces of the member by clamp means 23 and 24, respectively. Fluid seals are provided between the ceramic member 18 and the end plates, between the bottom end plate 21 and the base plate 11, and between the top end plate 22 and the terminal 15 to maintain the interior of the pothead in fluid-sealed pressure-tight condition.

The ceramic member 18 is formed with integral radial enlargements 25 and 26 which extend outwardly from the wall 27 at the two ends of the member respectively. The outer surfaces of the radial enlargements, e.g. the surface 28 of the enlargement 25 are coaxial with the interior surface 29 of the member and the axially inward extremities of the enlargements, away from the ends of the member, have inwardly inclined surfaces, e.g. the surface 30 for the enlargement 25. The surface 30 merges with the outer surface 28 of the enlargement and the outer surface 31 of the wall 27. The end surface of the ceramic member is referred to as an end face, e.g. the end face 32 at the bottom end of the member.

Figure 2:
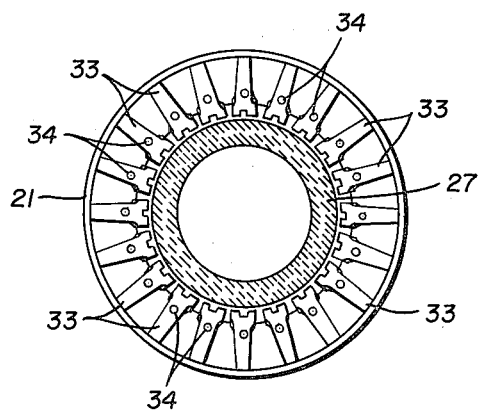
FIG. 2 is a partial section view taken in the direction 2—2 in FIG. 1.
Figure 3:
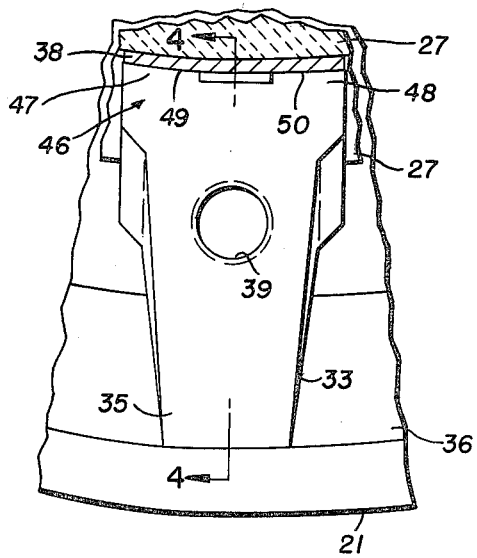
FIG. 3 is an enlarged view of a portion of the plan view of FIG. 2, and illustrating particularly a clamp and an associated sector of the end plate and housing member.

The clamp means referred to at 23 and 24 in FIG. 1 each comprise a number of generally arcuate clamps which are disposed peripherally about the housing member 17 in engagement with the associated enlargement and end plate. Thus at the bottom end of the pothead, shown in FIGS. 2, 3 and 5, twenty clamps, individually designated at 33, are arranged at equi-spaced intervals around the ceramic member and bear upon the enlargement 25 and upon the end plate 21. The number of clamps utilized will depend upon the load upon the end plate. This is, of course determined by the maximum internal pressure, which the device is intended to accommodate, taken with the area of that portion of the end plate over which the insulating medium acts.

The end plate 21 is drawn against the end face 32 of the ceramic member and the clamp 33 is compressed against the enlargement 25 and the end plate 21 by means of a bolt 34 which is threaded into an opening in the clamp. The end of the outer part 35 of the clamp 33 is received in an annular groove 36, coaxially about the member 17, in the adjacent side of the end plate 21. A pad 38 is interposed between the face of the clamp 33 at the end of the inner part 37 of the clamp, and the face 30 of the enlargement 25, and distributes the forces applied upon the ceramic member by the clamp. The outer part 35 of the clamp 33 refers to that part of the clamp which is disposed in the radially outward direction from the bolt opening 39 when the clamp is in an installed position. The inner part 37 of the clamp refers to that part of the clamp which is disposed in the radially inward direction from the bolt opening 39 when the clamp is in an installed position.

Figure 4:
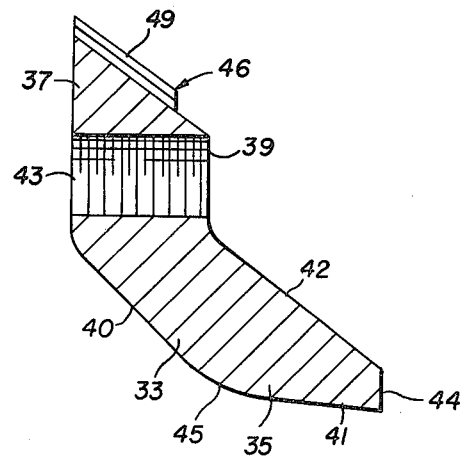
FIG. 4 is a section view of the clamp, taken in the direction 4—4 in FIG. 3.

The clamp 33 has an elongate, generally arcuate configuration, the actual configuration of the member being of importance in the practice of the invention. Thus, in FIG. 4, the outer part 35 of the clamp is formed with inclined surfaces 40, 41, and 42 and extends from the horizontal center part 43 to the outer end 44 of the clamp. The outer part 35 has a substantially constant cross section from the center part 43 of the clamp to the portion defined by a curved surface 45 and then tapers to the outer end 44 of the clamp. The configuration shown is electrically and mechanically smooth, that is there are no sharp points which would produce corona and no stress concentrations. For purposes of design the faces 41, 44, 49 and 50, and the opening 39 are important in determining the maximum withstand load of the clamp.

The inner part 37 of the clamp 33 extends in a horizontal direction from the center part 43 of the clamp to the inner end 46 (general designation) of the clamp. Two shoulders 47 and 48 are formed, on the inner end 46, with generally arcuate faces 49 and 50. The faces 49 and 50 are inclined toward the opening 39, in the downward direction, at an angle to the center part 43 equal to that of the surface 30 of the enlargement 25 on the ceramic member 18 relative to the end face 32. The faces 49 and 50 are designed to conform to the surface 30 (in cross sectional view, e.g. as in FIG. 5, the face lines are parallel) for some arbitrary temperature referred to herein as ambient temperature. At this temperature the opposed portions of the clamp faces and bearing face of the enlargement are parallel, either before or after the bolt 35 is tightened and the pad 38 compressed between the members, according to design dictates.

The connection between the ceramic member 18, and the end plate 21 is sealed by two gaskets, e.g. O-rings 51 and 52, received in coaxial grooves 53 and 54 extending into the end plate from the inner face 55 thereof. The O-rings 51 and 52 bear against the end-face 32 of the member 18 as a stop to prevent the escape of the insulating medium from between the members. The portion 56 of the end-plate defined by the grooves 53 and 54 comprises a bearing ring and may extend a short distance above the face 55 of the end-plate. With this arrangement the bearing ring receives a substantial part of the compressive force exerted between the parts and thereby prevents chipping of the ceramic corners, all as set forth in co-pending application Serial No. 742,777 filed June 18, 1958, now abandoned. The grooves 53 and 54 are of course located concentrically with respect to the ceramic member 18 and of the end plate 21, and so that the inner groove 54 is not less than a predetermined distance from the inside surface 29 of the member 18 for the highest temperature and the groove 53 is not less than a predetermined distance from the outer surface 28 of the ceramic member for the lowest temperature, intended to be accommodated in design.

Figure 5:
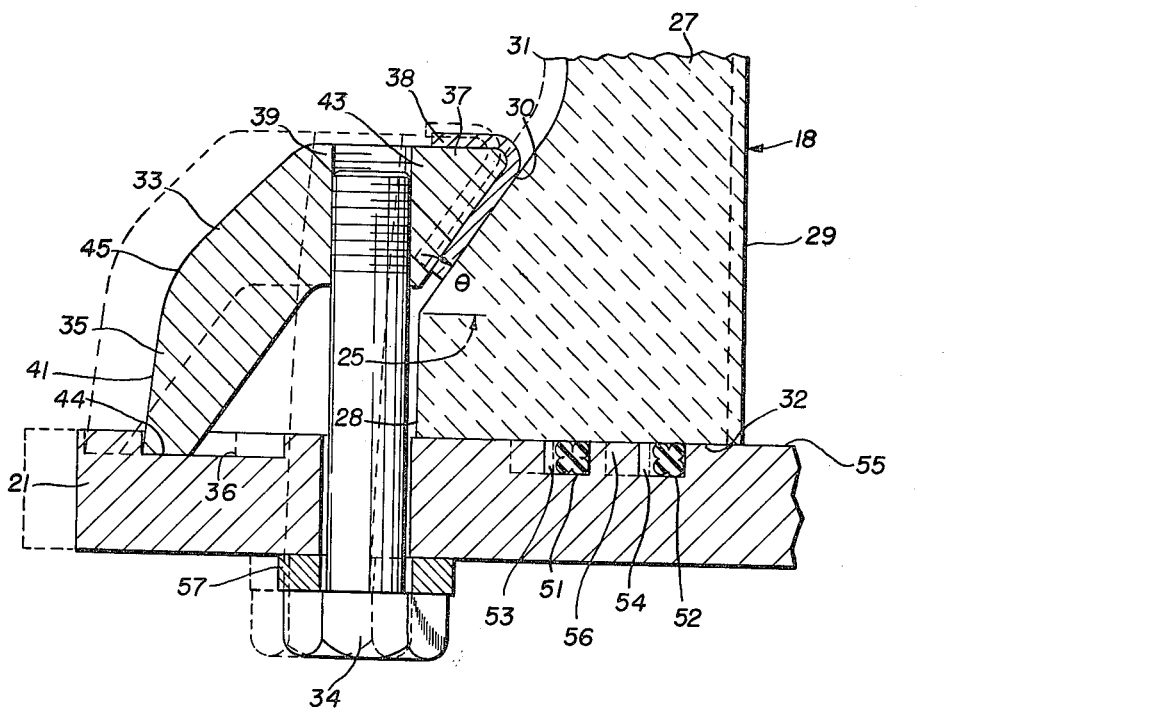
FIG. 5 is an enlarged section view of the pothead of FIG. 1, illustrating the way in which the joint accommodates thermal expansion of the members.

The functioning of the apparatus of the invention will be understood by reference to FIG. 5, which shows the effect of a temperature increase in an apparatus utilizing a ceramic member 18 of porcelain, end plate 21 and bolt 24 of stainless steel, and clamp 33 of brass, having thermal coefficients of expansion of $6 \times 10^{-6}$, $10.7 \times 10^{-6}$, and $17.4 \times 10^{-6}$, per degree C., respectively. The showing of the parts is in solid outline for the assumed temperature, and in dotted outline, for a temperature increase of 100° C., but exaggerated by a factor of one-hundred, so that the representation is of a change of 10,000° C., using the same coefficients of expansion.

The functioning of the apparatus involves several effects, all of which tend to maintain the pressure of the end plate 21 against the face 32 of the ceramic member 18 and to maintain the seal between the parts against the pressure of the medium within the housing. These are: first, an axial component of elongation of the clamp 33 tending to offset the difference between the elongation of the bolt and the elongation of the end plate 21 and the elongation of the enlargement 25, all in the axial direction; second, a radial component of elongation of the clamp 33 tending to offset the difference in radial movement of the end plate 21 and the ceramic member 18; and third, a cantilever movement of the inner end 46 of the clamp 33 brought about by the elongation of the part 35 of the clamp, against the bolt 34 as a pivot, tending to maintain the parallel alignment between the faces 49 and 50 of the clamp 33 and the face 30 of the ceramic member.

The nature of the first effect will be evident by reference to FIG. 5. It will be seen that the thermal expansion of the members results in an elongation of the bolt 34, which would reduce the compressive force exerted by the member 33 upon the bearing face 30. The elongation of the bolt is compensated for to some extent by the increase in thickness, e.g. in the axial direction, of the end plate 21 and the enlargement 25. However, these effects are small and the elongation of the bolt is offset substantially by the elongation of the clamp 33 in the axial direction.

As to the second effect, the thermal expansion of the members results in concurrent movement of the end-plate 21 and the ceramic member 18 in the radially outward direction, because of the difference in coefficients of expansion of the two members but by different amounts. Thus the surfaces 28 and 30 of the ceramic member assume the positions 20' and 30' and the groove 36 assumes the position indicated at 36'. The difference in distance between the groove 36 and surface 28 and groove 36' and surface 28' is offset by the elongation in the radial direction of the clamp 33.

The third effect is brought about by the elongation of the part 35 of the clamp 33, which acts against the end plate 21 at the outer end 44 of the clamp and against the upper end of the bolt 34. Due to the fact that the clamp is constrained by the bolt 34, the increase in the length of the part 35 causes a sidewise deflection of the upper end of the bolt, and to some extent, a pivotal movement of the bolt about the washer or spacer 57. Accordingly, the inner end part 46 of the clamp is forced generally toward the face 28' of the ceramic member in a rocking movement of the clamp which tends to maintain the faces 47 and 48 in the same disposition as at the ambient temperature of the pieces.

The sum-total of these effects is such that the compressive forces between the clamp 33, the ceramic member 18, and the end plate 21, and the tension in the bolt 34 remain substantially constant for large increases and decreases in temperature. The converse of the above described effects take place, of course, when the temperature of the housing and of the pothead is reduced, either from high temperatures or from the ambient temperature.

The clamp 33 is made preferably from a metal such that the temperature coefficient of expansion of the end plate 21 is intermediate between that of the ceramic material of the member 18 and that of the clamp. Again, the angle between the bearing face 30 of the enlargement 25 and the end-face 32, herein referred to as angle $\theta$ is important, since the extent of the rocking effect is limited by the dimensions and coefficients of expansion of the members. The angle is so chosen that the expansion is in a direction normal to this face.

In the embodiment of the invention, referred to above, the diameter of the ceramic member, measured at the outer surface 28, was 13¾"; the outside diameter of the groove 36 was 18" and the angle of inclination of the bearing face 39 was 55°. Sixteen clamps were arranged at equi-spaced intervals about the ceramic member. The housing was tested while filled with water held at a pressure of 500 p.s.i. The housing was immersed in a water bath having a temperature of 154° F. and after twenty minutes was removed and immediately placed in water at 40° F. and immersed for an equal length of time. This immersion cycle was repeated with the time intervals progressively increased to one hour. After sixty cycles, the housing was found to be in good condition. Since, as is known, the severity of a thermal test increases with the length of the time interval used in the test cycle, it will be seen that the housing withstood tests of greater severity than generally accepted standard tests.

The housing was transferred from the one bath to the other bath without delay, so that the housing was subjected to and successfully withstood thermal shocks much more severe than would ordinarily be encountered in most installations.

The construction and arrangement of the invention is advantageous and functions under the severe conditions of loading and change described above, in part because the design may be accomplished for a rigid structure. Accordingly, variations and departures from ideal behaviour of the parts is accommodated by elastic changes in the parts and such changes will counteract dimensional variations in the parts due to manufacturing tolerances. Additionally, the enlargement 25 serves as a reinforcement at the end of the ceramic member. This part of the structure has heretofore been particularly susceptible to failure because of stress concentrations at the inside corner of the piece, although the problem was considered in the prior application heretofore referred to.

The principles of the invention are, of course, applicable whatever the specific combination of materials utilized for the housing members. Thus the use of an end plate and clamps of aluminum, and a bolt of stainless steel would result in a combination of parts having extreme characteristics with respect to temperature change. The invention may, in principle, be practiced with materials such that the temperature coefficient of expansion of the end plate and of the bolt is less than that of the clamp.

If necessary or desirable, the washer 57 may be constructed of material such that the bolt has an apparent negative coefficient of expansion for a given temperature change. Thus, for an aluminum end plate, aluminum clamp and a stainless steel bolt, an aluminum spacer may be utilized to produce a net reduction in the length of the bolt (between the end plate and the clamp) for a predetermined range of temperature.

The term "axially directed face" is used herein to refer to the face of a member or part thereof extending in a direction perpendicular to the longitudinal axis of the ceramic housing member 18, such as, e.g. the face 32 of the end plate 21. The term "radially directed face" is used herein to refer to the face of a member or a part thereof extending in a direction parallel to the longitudinal axis of the member 18, as, e.g. the interior surface 29 of the member 18.

It is to be understood that the foregoing description is not intended to restrict the scope of the invention and that various rearrangements of the parts and modifications of the design may be resorted to. The following claims are directed to combinations of elements which embody the invention or inventions of this application.

We claim:
1. A housing assembly for electrical apparatus comprising a tubular ceramic member, means at an end of the ceramic member with an inwardly tapered surface away from the said end to constitute a bearing face, a metal end plate arranged across the end of the ceramic member, an elongate generally arcuate metal clamp having one end thereof engaging the end plate with means on the plate outwardly from the clamp engaged by the clamp at the said one extremity thereof for holding the clamp against radially outward movement on the end plate and the remaining end of the clamp bearing upon the said bearing face, and fastener means disposed radially between the said two ends of the clamp and extending between the end plate and the clamp for drawing the clamp against the end plate and the ceramic member to hold the end plate against the end face of the ceramic member in pressure contact therewith, all for elongation and contraction of the clamp members to accommodate radial expansion and contraction of the ceramic member and end plate while maintaining the pressure contact thereof with change in temperature of the assembly.

2. Apparatus in accordance with claim 1 in which the clamp bears at the said one end thereof upon an axially directed face of the end plate and engages the means on the plate outwardly from the clamp on a radially directed face thereof.

3. A housing assembly in accordance with claim 1 with means on the transversely opposite side of the ceramic member from the first named clamp including at least a second clamp, means on the end plate engaged by the second clamp, means at an end of the ceramic member with an inwardly tapered surface constituting a bearing face and an end of the second clamp bearing thereon, and a second fastener means, all similar to the first named clamp, first named means on the end plate engaged by the clamp, first named means at an end of the ceramic member with an inwardly tapered surface, and first named fastener means, respectively, the two clamps being opposed in elongation and contraction thereof.

4. A housing assembly for electrical apparatus comprising a tubular ceramic member, a radial enlargement of the wall of the ceramic member extending axially of the member at an end thereof with an inwardly inclined surface away from the said end to constitute a bearing face, a metal end plate arranged across the end of the ceramic member, a groove in the end plate, in the side thereof adjacent the ceramic member, and coaxially about and outwardly from the enlargement, a plurality of elongate generally arcuate metal clamps arranged in circumferentially spaced relation coaxially about the ceramic member, the clamps extending radially from the ceramic member and each having one end thereof received in the groove and the remaining end bearing upon the bearing face, and fastener means for each clamp comprising bolt means extending axially between the end plate and the clamp for drawing the clamp against the end plate and ceramic member to hold the end plate against the end face of the ceramic member, in pressure contact therewith, all for elongation and contraction of the clamp members to accommodate radial expansion and contraction of the ceramic member and end plate while maintaining the pressure contact thereof with change in temperature of the assembly.

5. Apparatus in accordance with claim 4 with a second similar enlargement, end plate, clamp and fastener means at a second end of the ceramic member and seals between the ceramic member and the respective end plates, all constituting a fluid-sealed pressure-tight insulating enclosure, effective over a wide range of thermal temperature variation and thermal shock.

6. Apparatus in accordance with claim 4 in which the temperature coefficient of expansion of the end plate is between that of the clamp and that of the ceramic member.

7. Apparatus in accordance with claim 4 in which a pad of resilient material is interposed between the clamp and the enlargement to distribute the forces exerted by the clamp upon the ceramic member.

8. Apparatus in accordance with claim 4 in which a bolt extends through the end plate and is threaded into the clamp at the inner end thereof adjacent the ceramic member which inner end is axially spaced from the end plate and in which the end of the bolt threaded into the clamp is moved in the radial direction of the ceramic member with the elongation and contraction of the clamp.

9. Apparatus in accordance with claim 4 in which a spacer is received between the bolt means and the end plate on the side thereof away from the ceramic member and the spacer has a temperature coefficient of thermal expansion greater than that of the bolt for compensating for the elongation and contraction of the bolt.

10. A mechanical connection between a first structural member and a second structural member at an end of the first member and bearing against an end face thereof, the said members having different temperature coefficients of thermal expansion, means on the said first member defining an inwardly directed inclined surface spaced from the end face of the member, an elongate, generally arcuate rigid clamp having one end thereof bearing upon the second member and the remaining end bearing upon the said inclined surface, means on the said second member outwardly from the said clamp and engaged by the clamp at said one end thereof for holding the clamp against transversely outward movement, fastener means for the clamp comprising bolt means extending between the second member and the clamp for drawing the clamp against the two members, means on the transversely opposite side of the first member from the clamp holding the two members against relative movement of the first member away from the clamp, all for elongation and contraction of the clamp to accommodate transverse expansion and contraction of the two members while holding the second member against the end of the first member during change in temperature thereof.

11. Apparatus in accordance with claim 10 in which the last named means comprises a second similar first named means, clamp, and second named means.

12. Apparatus in accordance with claim 10 in which the bolt means is received through an opening in the second member and a spacer is received between the bolt means and the second member on the side thereof away from the clamp, and the spacer has a temperature coefficient of thermal expansion greater than that of the bolt to compensate for changes in the length of the bolt with change in the temperature thereof.

13. Apparatus in accordance with claim 10, in which the second member has a groove with the said one end of the clamp received therein and in which the means on the second member outwardly from the clamp comprises a part of the member adjacent the groove.

References Cited in the file of this patent
UNITED STATES PATENTS

| 1,663,007 | Jacobs | Mar. 30, 1928 |
| 2,230,194 | Stevens | Jan. 28, 1941 |
| 2,289,164 | Arnold et al. | July 7, 1942 |
| 2,720,552 | Macardier | Oct. 11, 1955 |
| 2,849,528 | Dutton | Aug. 26, 1958 |

FOREIGN PATENTS

| 154,921 | Switzerland | Aug. 1, 1932 |
| 992,862 | France | July 11, 1951 |
| 893,065 | Germany | Oct. 12, 1953 |